(12) United States Patent
Sakamoto et al.

(10) Patent No.: US 8,755,638 B2
(45) Date of Patent: Jun. 17, 2014

(54) IMAGE PROCESSING APPARATUS, NON-TRANSITORY COMPUTER READABLE MEDIUM, AND IMAGE PROCESSING METHOD FOR RESOLUTION CONVERSION USING A RATIO

(75) Inventors: Masaomi Sakamoto, Kanagawa (JP); Makoto Sasaki, Kanagawa (JP); Masaru Okutsu, Kanagawa (JP); Daigo Hama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 242 days.

(21) Appl. No.: 13/338,671

(22) Filed: Dec. 28, 2011

(65) Prior Publication Data

US 2013/0071044 A1   Mar. 21, 2013

(30) Foreign Application Priority Data

Sep. 21, 2011   (JP) ................................ 2011-206493

(51) Int. Cl.
*G06K 9/32* (2006.01)
*G06F 15/00* (2006.01)
*G06K 1/00* (2006.01)
*G06K 9/36* (2006.01)

(52) U.S. Cl.
CPC ...................................... *G06K 9/36* (2013.01)
USPC ............................. 382/299; 382/300; 358/1.2

(58) Field of Classification Search
USPC ........... 382/298–300, 254, 260, 274; 358/1.2, 358/504
See application file for complete search history.

(56) References Cited

U.S. PATENT DOCUMENTS

| 7,444,026 | B2 * | 10/2008 | Fujimoto ...................... 382/236 |
| 8,345,292 | B2 * | 1/2013 | Kimura ........................ 358/1.15 |
| 8,463,076 | B2 * | 6/2013 | Kondo .......................... 382/299 |
| 2004/0125387 | A1 * | 7/2004 | Nagao et al. .................. 358/1.2 |
| 2005/0134870 | A1 * | 6/2005 | Kugo ............................. 358/1.2 |
| 2005/0264849 | A1 * | 12/2005 | Hagiwara ...................... 358/2.1 |
| 2007/0122050 | A1 * | 5/2007 | Hasegawa et al. ............ 382/266 |

FOREIGN PATENT DOCUMENTS

JP   A-2007-156547   6/2007

* cited by examiner

*Primary Examiner* — Andrae S Allison
(74) *Attorney, Agent, or Firm* — Oliff PLC

(57) ABSTRACT

An image processing apparatus includes a determination unit that determines a type of a provided object, a resolution conversion unit that converts a resolution of the object determined by the determination unit as an image into a resolution of an output image, an object processing unit that performs a spatial frequency processing for the object after the resolution conversion by the resolution conversion unit depending on a ratio between a resolution of the object before the resolution conversion and a resolution of the output image, and a generating unit that generates the output image based on the object subjected to the spatial frequency processing in the object processing unit.

14 Claims, 7 Drawing Sheets

IMAGE PROCESSING APPARATUS, NON-TRANSITORY COMPUTER READABLE MEDIUM, AND IMAGE PROCESSING METHOD FOR RESOLUTION CONVERSION USING A RATIO

CROSS-REFERENCE TO RELATED APPLICATIONS

This application is based on and claims priority under 35 USC 119 from Japanese Patent Application No. 2011-206493 filed Sep. 21, 2011.

BACKGROUND (i) Technical Field

The present invention relates to an image processing apparatus, a non-transitory computer readable medium, and an image processing method.

(ii) Related Art

In order to output an image to an output device, a drawing processing is performed for an object at a resolution of the output image based on drawing information provided, and various kinds of image processing including spatial frequency processing are performed for the drawn output image. As the given object, for example, there is an object of an image such as a photograph or an image read from a reader device. The object of the provided image has various resolutions, and the resolution is converted at the time of drawing. As described above, since the spatial frequency processing is performed for the output image after the drawing, the spatial frequency processing is performed without considering the resolution of the object of the provided image. For this reason, if the original resolution is lower than the output resolution, and enlargement is made at the time of drawing, deterioration of image quality generated at the time of enlargement may be emphasized. The deterioration of image quality may be alleviated, compared to the enlargement techniques of the related art, if a technique that is called super-resolution conversion in which the resolution is converted based on similarities with neighboring images is used as the resolution conversion technique. However, even when this technique is used, overcorrection may occur in the spatial frequency processing.

SUMMARY

According to an aspect of the invention, there is provided an image processing apparatus including: a determination unit that determines a type of a provided object; a resolution conversion unit that converts a resolution of the object determined by the determination unit as an image into a resolution of an output image; an object processing unit that performs a spatial frequency processing for the object after the resolution conversion by the resolution conversion unit depending on a ratio between a resolution of the object before the resolution conversion and a resolution of the output image; and a generating unit that generates the output image based on the object subjected to the spatial frequency processing in the object processing unit.

BRIEF DESCRIPTION OF THE DRAWINGS

Exemplary embodiments of the present invention will be described in detail based on the following figures, wherein.

DETAILED DESCRIPTION

Figure 1:
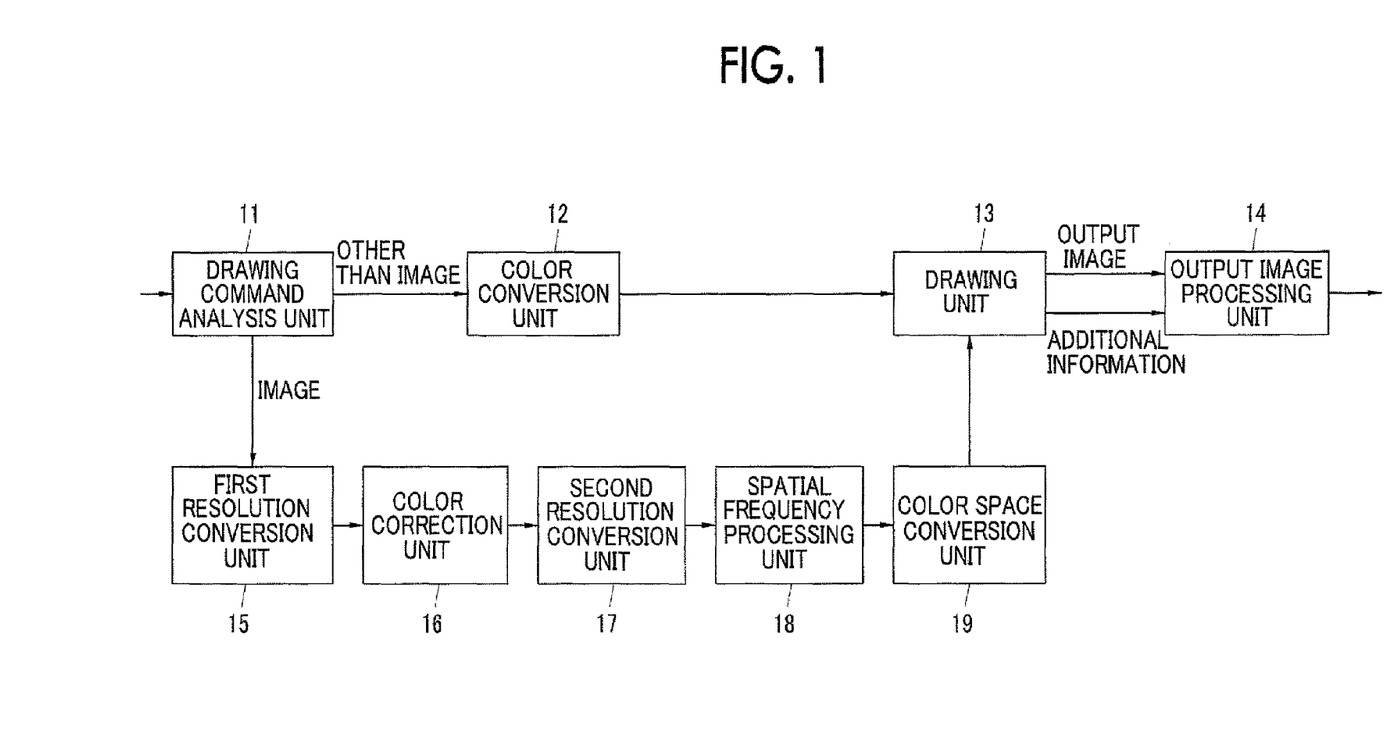
FIG. 1 is a configuration diagram according to an exemplary embodiment of the invention.

FIG. 1 is a configuration diagram according to an exemplary embodiment of the invention. Referring to FIG. 1, the image processing apparatus includes a drawing command analysis unit 11, a color conversion unit 12, a drawing unit 13, an output image processing unit 14, a first resolution conversion unit 15, a color correction unit 16, a second resolution conversion unit 17, a spatial frequency processing unit 18, and a color space conversion unit 19. In this example, it is assumed that a drawing command described using, for example, a so-called printer description language (PDL) or other description languages is received, and a raster format output image is output. Drawing for one or more objects is instructed by the drawing command, and an output image is generated by performing a drawing processing for the instructed one or more objects. There are several kinds of objects, and there is an object of an image as an example. The object of the image includes, for example, a photograph image, an image read from an image reader, an image obtained by processing them, other rasterized images, and the like. It is assumed that resolution information is added to the object of the image.

The drawing command analysis unit 11 analyzes the drawing command and generates intermediate information for performing the drawing processing in the drawing unit 13. In this case, the drawing command analysis unit 11 also serves as a determination unit for determining the type of object to be drawn and also has a function of switching between each processing depending on the type of the object. In this example, if the type of object is an image, the corresponding object is subjected to processing from the first resolution conversion unit 15 to the color space conversion unit 19 and is transmitted to the drawing unit 13. For other types of objects, the object is transmitted to the drawing unit 13 through the color conversion unit 12. It follows that not only image object, but also other kinds of objects, may be processed depending on the type of the object.

In this example, the color conversion unit 12 performs various kinds of color processes such as color correction or color space conversion for other kinds of objects than images. This process may be performed for the color information designated to the object since the drawing has not been performed.

The drawing unit 13 generates an output image based on one or more objects. In this example, the other types of objects than images are received from the color conversion unit 12, and the object of the image is received from the color space conversion unit 19. Naturally, if the other types of objects than images are processed depending on the type of object, the object is received from each processing unit. The received object is drawn on the output image to generate the output image. Since the spatial frequency processing has been already finished for the object of the image before the drawing as described below, additional information indicating the area drawn based on the object of the image is added to the area drawn based on the object of the image in order to prevent the output image processing unit 14 from performing another spatial frequency processing, and the output image is transmitted to the output image processing unit 14. It follows that if the output image processing unit 14 does not perform the spatial frequency processing, it is not necessary to add the additional information.

The output image processing unit 14 performs various kinds of image processings such as a spatial frequency processing or a gray-scale correction processing for the entire output image received from the drawing unit 13 and transmits the result of the image processing to various output devices such as an image forming device. The output image processing unit 14 does not perform the spatial frequency processing for the portion identified as the area that is drawn based on the object of the image, by the additional information received from the drawing unit 13 along with the output image because the spatial frequency processing has been already performed for that area. Techniques of the related art may be used to perform the spatial frequency processing in the output image processing unit 14.

The first and second resolution conversion units 15 and 17 convert the resolution of the object that the type of the object is determined as an image into the resolution of the output image. The first resolution conversion unit 15 converts the resolution of the object into the resolution of the output image if the resolution of the object that the type of the object is determined as an image in the drawing command analysis unit 11 is higher than the resolution of the output image. This resolution conversion corresponds to reduction, in which the amount of information to be processed by the color conversion unit 16 is reduced. In addition, if the resolution of the object determined as an image is lower than the resolution of the output image, the second resolution conversion unit 17 converts the resolution of the object into the resolution of the output image. This resolution conversion corresponds to enlargement. While the amount of information is reduced after enlargement, the processing of the color conversion unit 16 is performed. The first and second resolution conversion units 15 and 17 constitute a resolution conversion unit. Naturally, the reduction conversion and the enlargement conversion may be performed in any one of them. In addition, if the color correction unit 16 is not provided, the first and second resolution conversion units 15 and 17 may be integrated into a single body. How to convert the resolution is not particularly limited, and, for example, a technique capable of retaining image quality such as a bi-cubic technique may be used. In addition, depending on the magnification ratio (for example, if the magnification ratio is equal to or greater than a second value described below), a so-called super-enlargement technique may be used in the enlargement processing to retain the image quality. The resolution of the output image may be designated using various techniques. For example, the resolution of the output image may be determined in advance, instructed by the drawing command, designated by an external side, instructed by a user using a manipulation unit (not shown), and the like.

The color correction unit 16 performs a color correction processing for the object of the image. For example, the color correction unit 16 may perform various color processes such as white spot adjustment, contrast correction, color temperature conversion, and adjustment of memory colors such as skin or sky. Techniques of the related art may be used in each of the processes, and description thereof will not be repeated here.

The spatial frequency processing unit 18 performs spatial frequency processing for the object of the image converted by the first or second resolution conversion unit 15 or 17 at a resolution of the output image depending on a ratio between the resolution before the resolution conversion of the object and the resolution of the output image, for example, a value obtained by dividing the resolution of the output image by the resolution of the object of the image before the resolution conversion ((resolution of output image)/(resolution of object before resolution conversion)=magnification ratio). For example, the spatial frequency processing is not performed for the object if the magnification ratio is equal to or smaller than a first predetermined value smaller than 1, and the magnification ratio is equal to or greater than a second predetermined value greater than 1. If the magnification ratio is greater than the first value and smaller than the second value, the spatial frequency processing may be uniformly performed, or the spatial frequency processing may be performed by changing the frequency band depending on the magnification ratio.

If the magnification ratio is equal to or smaller than the first value, sharpness increases due to the reduction processing after the resolution conversion. Therefore, it may not be necessary to perform the spatial frequency processing. If the magnification ratio is equal to or greater than the second value, a high-frequency component is reduced after the resolution conversion due to the enlargement process. Therefore, even when the emphasis processing is performed through the spatial frequency processing, the result may be not reflected on the output image, and thus, it may not be necessary to perform the spatial frequency processing. In addition, if the magnification ratio is greater than the first value and smaller than the second value, for example, the frequency band may be changed such that the lower frequency band is emphasized as the magnification ratio increases.

The color space conversion unit 19 converts the color space used to express colors of the object into the color space of the output image. Techniques of the related art may be used to convert the color space. In addition, a color correction processing may also be performed during the color space conversion in the color space conversion unit 19. The color space conversion may be performed during the drawing processing in the drawing unit 13, or the color space conversion processing performed by the color conversion unit 12 may be shared. In this case, the color space conversion unit 19 may be not provided.

Figure 2:
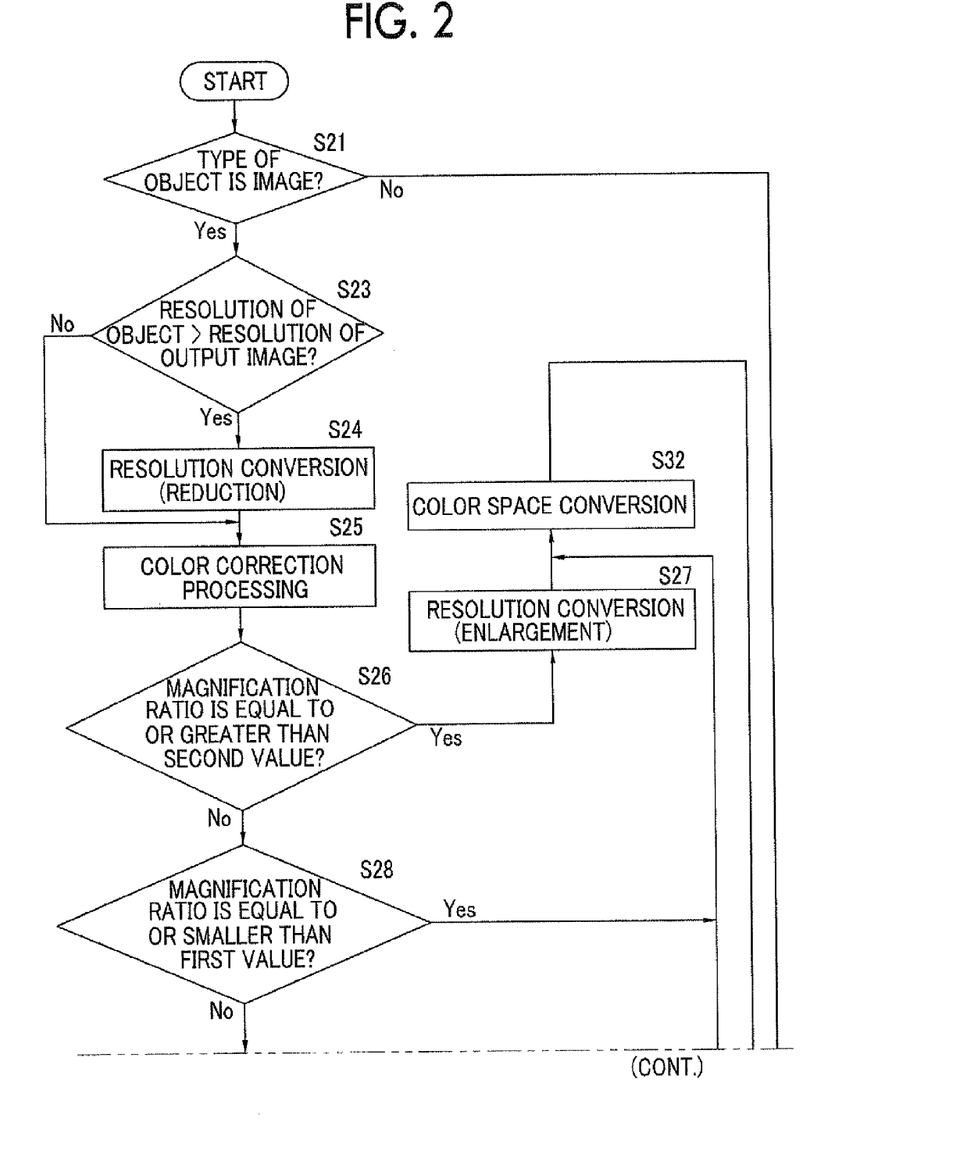
FIG. 2 is a flowchart illustrating an example of the operation according to an exemplary embodiment of the invention.

FIG. 2 is a flowchart illustrating an example of the operation according to an exemplary embodiment of the invention. In S21, the drawing command analysis unit 11 analyzes the drawing command and determines the type of object to be drawn. In this example, if the type of the object is not an image, the color conversion unit 12 performs various processes such as color correction or color space conversion for the object in S22, and the process advances to the drawing processing in S33.

Meanwhile, if it is determined that the type of the object is an image, it is determined whether or not the resolution of the object is higher than the resolution of the output image in S23. If the resolution of the object is higher than the resolution of the output image, the first resolution conversion unit 15 converts the resolution of the object into the resolution of the output image in S24, and the process advances to S25. This resolution conversion corresponds to the reduction process. If the resolution of the object is equal to or lower than the resolution of the output image, the first resolution conversion unit 15 does not perform the resolution conversion, and the process advances to S25. Then, the resolution of the object becomes equal to or lower than the resolution of the output image.

In S25, the color correction unit 16 performs a color correction processing for the object of the image. For example, the color correction unit 16 performs various color processings such as white spot adjustment, contrast correction, color temperature conversion, and adjustment of memory colors such as skin or sky.

In S26, it is determined whether or not the magnification ratio is equal to or greater than a second predetermined value greater than 1. Here, the magnification ratio is a value obtained by dividing the resolution of the output image by the resolution of the object before the resolution conversion. A magnification ratio greater than 1 means enlargement, and a magnification ratio smaller than 1 means reduction. In S26, whether or not the magnification ratio is equal to or greater than the second value corresponding to the enlargement processing is determined. If it is determined that the magnification ratio is equal to or greater than the second value as a result of this determination, the resolution conversion (enlargement process) is performed, but a high-frequency component is reduced after the resolution conversion. In addition, even when the emphasis processing is performed by the spatial frequency processing, it may not be reflected on the output image. Therefore, the spatial frequency processing is not performed. In addition, if the magnification ratio is equal to or greater than 1, the resolution conversion processing in S24 is not performed. Therefore, in S27, the second resolution conversion unit 17 converts the resolution of the object into the resolution of the output image (enlargement conversion), and the process advances to S32 without performing the spatial frequency processing in the spatial frequency processing unit 18.

If the magnification ratio is smaller than the second value, it is determined whether or not the magnification ratio is equal to or smaller than a first predetermined value smaller than 1 in S28. If the magnification ratio is equal to or smaller than the first value, the resolution conversion (reduction process) is performed, but the sharpness increases due to the reduction processing after the resolution conversion. Therefore, the spatial frequency processing is not performed. In addition, the reduction processing for a case where the magnification ratio is smaller than 1 has been already performed in S24. Therefore, if it is determined that the magnification ratio is smaller than the second value, the process directly advances to S32.

If it is determined that the magnification ratio is greater than the first value in S28, that is, if the magnification ratio is smaller than the second value and greater than the first value, it is determined whether or not the resolution of the object is lower than the resolution of the output image, that is, whether or not the magnification ratio is greater than 1 in S29. If the resolution of the object is higher than the resolution of the output image, the process directly advances to S31 because the resolution conversion (reduction process) has been already performed in S24. If the resolution of the object is lower than the resolution of the output image, the second resolution conversion unit 17 converts the resolution of the object into the resolution of the output image (enlargement process) in S30, and the process advances to S31. Through the resolution conversion in S24 and S30, the resolution of the object matches the resolution of the output image.

In S31, the spatial frequency processing unit 18 performs the spatial frequency processing depending on the magnification ratio. The spatial frequency processing in S31 is performed for a case where the magnification ratio is greater than the first value and smaller than the second value. In this magnification ratio range, the spatial frequency processing may be performed uniformly, or the spatial frequency processing may be performed by changing the frequency band depending on the magnification ratio.

In S32, the color space conversion unit 19 converts the color space used to express colors of the object into the color space of the output image.

The processing of S22 is performed when the type of object is not an image, and the processings followed by S32 are performed when the type of the object is an image. In S33, the drawing unit 13 performs a drawing processing for the object to create the output image. In this case, additional information identifying the area of the output image obtained by drawing the object of the image is added thereto.

In S34, it is determined from the additional information whether or not the area is obtained by drawing the object of the image. If it is determined that the area is other than the area obtained by drawing the object of the image, the output image processing unit 14 performs the spatial frequency processing in S35, and the process advances to S36. In this case, the spatial frequency processing does not depend on the type of object, and the common processing is performed for the output image. However, for the area obtained by drawing the object of the image, the spatial frequency processing is not performed in S35, and the process advances to S36 in order to prevent spatial frequency processing from being repeated. In S36, the output image processing unit 14 performs various kinds of image processing other than the spatial frequency processing and outputs the output image.

Figure 3:
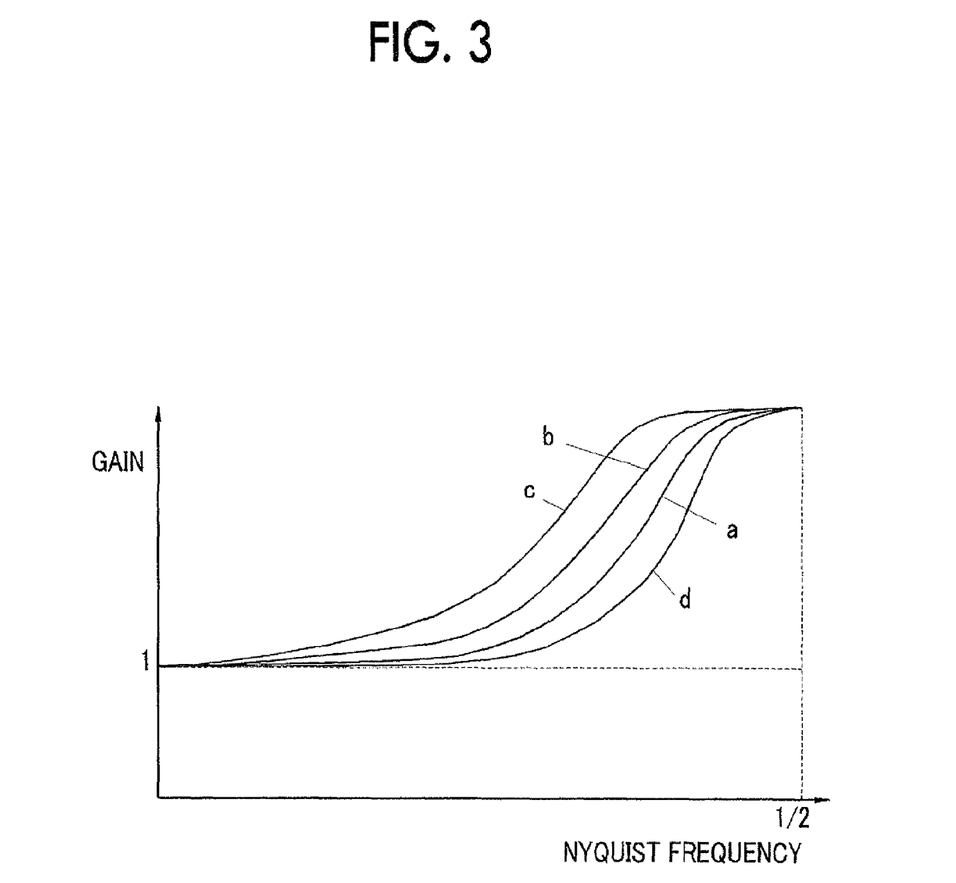
FIG. 3 is an explanatory diagram illustrating an example of the spatial frequency processing performed by the spatial frequency processing unit.

The spatial frequency processing depending on the magnification ratio performed by the spatial frequency processing unit 18 in S31 will be described in more detail. FIG. 3 is an explanatory diagram illustrating an example of the spatial frequency processing performed by the spatial frequency processing unit. Here, frequency characteristics are plotted when a high-frequency emphasis filter is used as an example of the spatial frequency processing. In FIG. 3, the curve a illustrates an exemplary frequency characteristic in a case where the magnification ratio is set to 1, the curve b illustrates an exemplary frequency characteristic in a case where the magnification ratio is set to 2, the curve c illustrates an exemplary frequency characteristic in a case where the magnification ratio is set to 3, and the curve d illustrates an exemplary frequency characteristic in a case where the magnification ratio is set to 0.75.

When the resolution conversion results in enlargement, the high-frequency component is reduced as the magnification ratio increases by the enlargement processing so that the emphasis effect of the high-frequency component is reduced. For this reason, for example, assuming that the spatial frequency processing is performed based on the frequency characteristic a in which the magnification ratio is set to 1 in FIG. 3, the spatial frequency processing may be performed using a high-frequency emphasis filter having frequency characteristics set to perform emphasis from the lower frequency area as indicated by the frequency characteristics b and c as the magnification ratio increases.

In comparison, when the resolution conversion results in reduction, the high-frequency component increases as the magnification ratio decreases by the reduction processing so that the effect of the emphasis on the high-frequency component increases. For this reason, for example, assuming that the spatial frequency processing is performed based on the frequency characteristic a in which the magnification ratio is set to 1 in FIG. 3, the spatial frequency processing may be performed using a high-frequency emphasis filter having frequency characteristics set to perform emphasis on the higher frequency area as indicated by the frequency characteristic d as the magnification ratio decreases.

Although the strength (gain) is not changed in the example of FIG. 3, the strength may be changed based on the magnification ratio in either case of enlargement or reduction.

Figure 4:
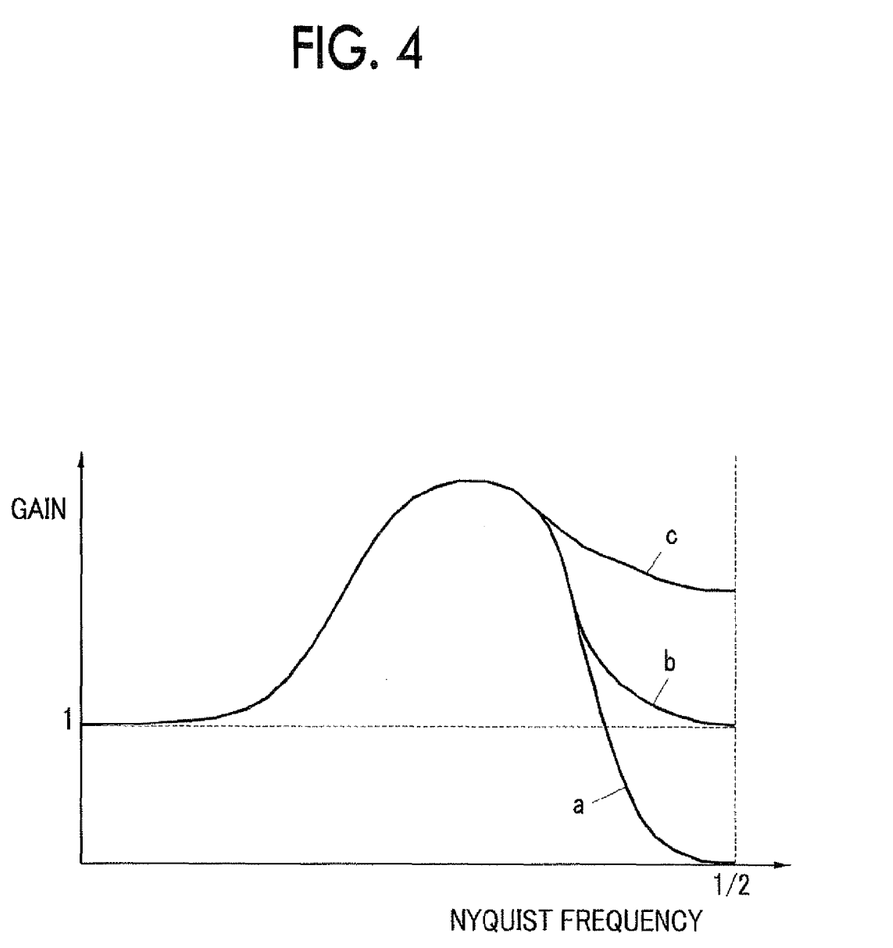
FIG. 4 is an explanatory diagram illustrating another example of the spatial frequency processing performed by the spatial frequency processing unit.

FIG. 4 is an explanatory diagram illustrating another example of the spatial frequency processing performed by the spatial frequency processing unit. FIG. 4 illustrates frequency characteristics when an intermediate-frequency emphasis/high-frequency suppression filter is used as an example of the spatial frequency processing. In this spatial frequency processing, the intermediate-frequency component is emphasized to provide sharpness and a stereoscopic sense, and the high-frequency component is suppressed to prevent the noise component from being emphasized. In FIG. 4, the curve a illustrates an exemplary frequency characteristic in a case where the magnification ratio is set to 1, the curve b illustrates an exemplary frequency characteristic in a case where the magnification ratio is set to 2, and the curve c illustrates an exemplary frequency characteristic in a case where the magnification ratio is set to 3.

When the resolution conversion results in enlargement, the high-frequency component decreases, and the noise component is suppressed as the magnification ratio of the enlargement processing increases. Therefore, it is not necessary to suppress the high-frequency component as the magnification ratio increases. For this reason, for example, assuming that the spatial frequency processing is performed based on the frequency characteristic a in which the magnification ratio is set to 1 in FIG. 4, the spatial frequency processing may be performed using an intermediate-frequency emphasis/high-frequency suppression filter having frequency characteristics set to smoothly suppress the high-frequency component as indicated by the frequency characteristics b and c as the magnification ratio increases.

In comparison, when the resolution conversion results in reduction, the high-frequency component increases as the magnification ratio decreases by the reduction process. However, in order to prevent the noise component from being emphasized, the increased high-frequency component may also be suppressed. For this reason, in the case of reduction, for example, the spatial frequency processing may be performed based on the frequency characteristic a in which the magnification ratio is set to 1 in FIG. 3. Naturally, even in the case of reduction, a different frequency characteristic may be set. For example, the suppression frequency may be set to increase as the magnification ratio decreases.

Although the intermediate-frequency component to be emphasized is not changed in the example of FIG. 4, the frequency of the intermediate-frequency component to be emphasized may be set to decrease as the magnification ratio increases, or the frequency of the intermediate-frequency component to be emphasized may be set to increase as the magnification ratio decreases. Although the strength (gain) is not changed in the example of FIG. 4, the strength of the intermediate-frequency component may be changed based on the magnification ratio in either case of enlargement or reduction.

Several numbers of the high-frequency emphasis filters shown in FIG. 3 and the intermediate-frequency emphasis/high-frequency suppression filters shown in FIG. 4 may be prepared in advance and selected depending on the magnification ratio. Alternatively, the coefficient of the filter having such frequency characteristics may be computed and used by changing the frequency where the emphasis is initiated depending on the magnification ratio.

Such spatial frequency processing depending on the magnification ratio is performed for each object that the type of the object is an image. Therefore, even when the resolutions of each object are different, the spatial frequency processing is performed depending on the resolutions of each object.

Figure 5:
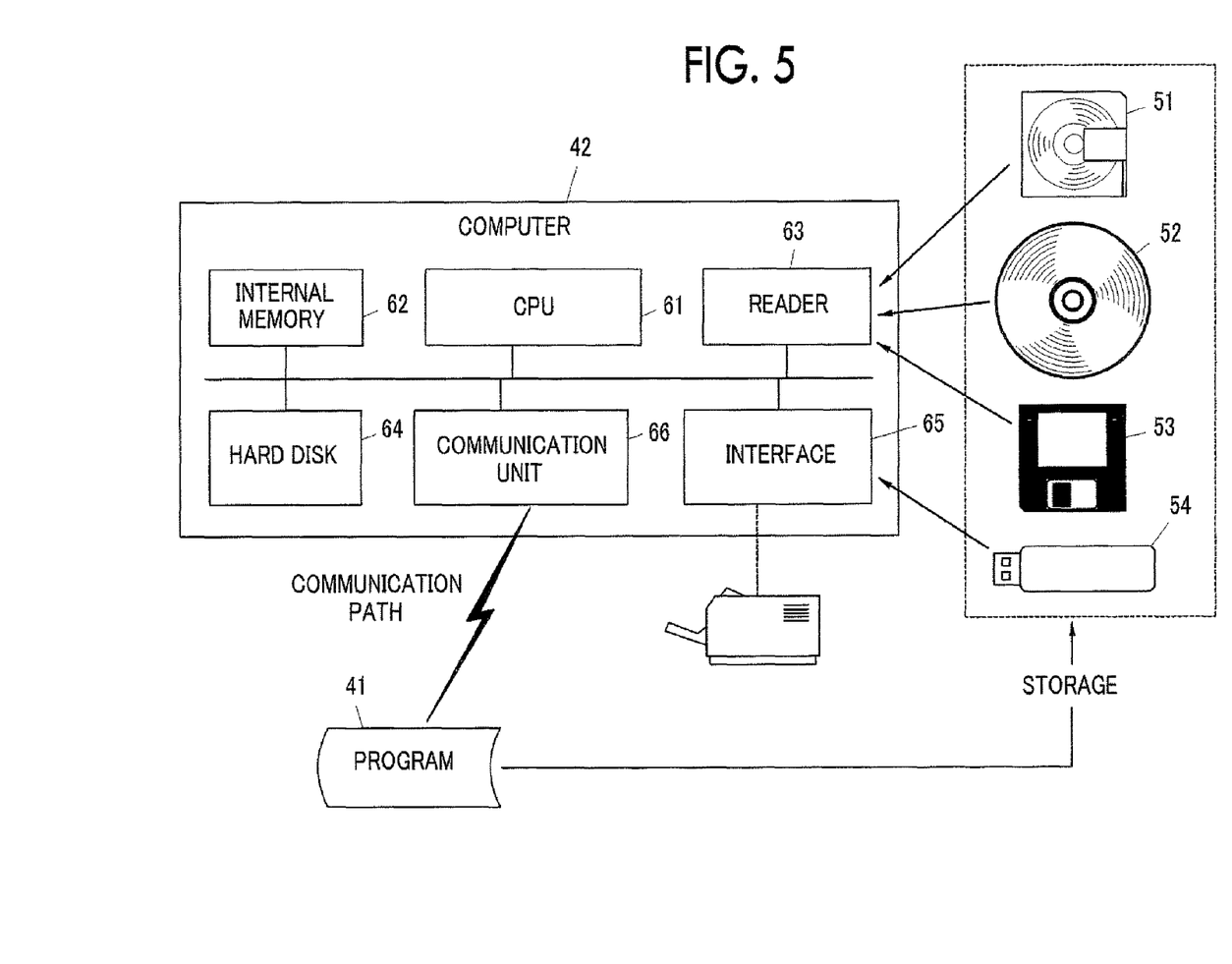
FIG. 5 is an explanatory diagram illustrating examples of a computer program, a storage medium storing the computer program, and a computer when the functions described in exemplary embodiments of the invention are implemented in a computer program.

FIG. 5 is an explanatory diagram illustrating examples of a computer program, a storage medium storing the computer program, and a computer when the functions described according to an exemplary embodiment of the invention are implemented in the computer program. Referring to FIG. 5, there are illustrated a program 41, a computer 42, an optical magnetic disk 51, an optical disk 52, a magnetic disk 53, a memory 54, a CPU 61, an internal memory 62, a reader 63, a hard disk 64, an interface 65, and a communication unit 66.

The invention may be embodied in a program 41 causing a computer to execute: all of or a part of functions of each unit described above according to an exemplary embodiment of the invention. In this case, the program 41 and data used in this program may be stored in a computer readable storage medium. The storage medium is used to deliver description contents of the program to a reader 63 provided in a computer hardware resource using a corresponding signal format by changing the state of magnetic, optical, or electrical energy, and the like according to the description contents of the program. For example, the storage medium includes an optical magnetic disk 51, an optical disk 52 (such as a CD or a DVD), a magnetic disk 53, a memory device 54 (such as an IC card, a memory card, and a flash memory), and the like. Naturally, such a storage medium is not limited to a portable type.

All or apart of the functions described above according to an exemplary embodiment of the invention are implemented such that, for example, the program 41 is stored in such a storage medium, the storage medium is installed in the reader 63 or the interface 65 of the computer 42, the program 41 is read from the computer and stored in the internal memory 62 or a hard disk 64 (such as a magnetic disk or a silicon disk), and the program 41 is executed by the CPU 61. Alternatively, all or a part of the functions may be implemented such that the program 41 is transmitted to the computer 42 via a communication path, the computer 42 receives the program 41 through the communication unit 66 and stores the program 41 in the internal memory 62 or the hard disk 64, and the CPU 61 executes the program 41.

Various devices may be connected to the computer 42 via other interfaces 65. For example, an image forming unit for forming an output image output from the output image processing unit 14 may be connected to the computer 42 via an interface 65. Naturally, all or a part of the functions may be configured with hardware. Alternatively, all or a part of the functions described in the exemplary embodiments of the invention may be contained in the program along with other configurations. If all or a part of the functions are applied to other applications, they may be integrated into the program of that application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a resolution conversion unit that converts a resolution of an image object into a resolution of an output image;
 an object processing unit that performs a spatial frequency processing for the image object after the resolution conversion depending on a magnification ratio obtained by dividing the resolution of the output image by the resolution before the resolution conversion of the image object for which the resolution has been converted; and
 a generating unit that generates the output image based on the image object subjected to the spatial frequency processing in the object processing unit,
 wherein the object processing unit does not perform the spatial frequency processing for the image object when the resolution conversion is a reduction processing and performs the spatial frequency processing for the image object when the resolution conversion is an enlargement processing.

2. The image processing apparatus according to claim 1, wherein the object processing unit changes a frequency range of the spatial frequency processing depending on the magnification ratio.

3. The image processing apparatus according to claim 2, wherein the object processing unit changes an intensity of the spatial frequency processing depending on the magnification ratio.

4. The image processing apparatus according to claim 3, wherein the object processing unit changes the frequency range of the spatial frequency processing such that a lower frequency band is emphasized as the magnification ratio increases.

5. The image processing apparatus according to claim 4, wherein the object processing unit changes an intensity of the spatial frequency processing depending on the magnification ratio.

6. The image processing apparatus according to claim 1, wherein the object processing unit changes an intensity of the spatial frequency processing depending on the magnification ratio.

7. The image processing apparatus according to claim 1, wherein the object processing unit performs the spatial frequency processing for the image object when the magnification ratio is greater than 1 and smaller than a second value and does not perform spatial frequency processing when magnification ratio is greater than the second value, the second value being greater than 1.

8. The image processing apparatus according to claim 7, wherein the object processing unit changes a frequency range of the spatial frequency processing depending on the magnification ratio.

9. The image processing apparatus according to claim 8, wherein the object processing unit changes an intensity of the spatial frequency processing depending on the magnification ratio.

10. The image processing apparatus according to claim 7, wherein the object processing unit changes an intensity of the spatial frequency processing depending on the magnification ratio.

11. The image processing apparatus according to claim 7, further comprising:
 a determination unit that determines a type of a provided object; and
 an output image processing unit that performs spatial frequency processing for the output image generated by the generating unit,
 wherein the generating unit adds additional information identifying an area that is drawn based on the object of the image received from the object processing unit thereto and transmits the output image to the output image processing unit, and the output image processing unit does not perform the spatial frequency processing for a portion identified as the drawn area by the additional information.

12. The image processing apparatus according to claim 1, further comprising:
 a determination unit that determines a type of a provided object; and
 an output image processing unit that performs spatial frequency processing for the output image generated by the generating unit,
 wherein the generating unit adds additional information identifying an area that is drawn based on the object of the image received from the object processing unit thereto and transmits the output image to the output image processing unit, and the output image processing unit does not perform the spatial frequency processing for a portion identified as the drawn area by the additional information.

13. A non-transitory computer readable medium for storing an image processing program for causing a computer to execute a function of the image processing apparatus according to claim 1.

14. An image processing method comprising:
 converting a resolution of an image object into a resolution of an output image;
 performing a spatial frequency processing for the image object depending on a magnification ratio obtained by dividing the resolution of the output image by the resolution before the resolution conversion of the image object for which the resolution has been converted; and
 generating the output image based on the image object subjected to the spatial frequency processing in the performing of the spatial frequency processing,
 wherein the processing for the image object does not perform the spatial frequency processing for the image object when the converting the resolution is a reduction processing and performs the spatial frequency processing for the image object when the converting the resolution is an enlargement processing.

* * * * *